(12) United States Patent
Ishii (10) Patent No.: US 11,115,578 B2
(45) Date of Patent: Sep. 7, 2021

(54) ELECTRONIC APPARATUS, CONTROL DEVICE, AND CONTROL METHOD (71) Applicant: SHARP KABUSHIKI KAISHA, Sakai (JP)

(72) Inventor: Yasushi Ishii, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/781,880

(22) Filed: Feb. 4, 2020

(65) Prior Publication Data
US 2020/0260020 A1 Aug. 13, 2020

(30) Foreign Application Priority Data
Feb. 7, 2019 (JP) .............. JP2019-020627

(51) Int. Cl.
H04N 5/225 (2006.01)
H04N 5/262 (2006.01)
H04N 5/232 (2006.01)
H04N 5/247 (2006.01)

(52) U.S. Cl.
CPC ....... H04N 5/2258 (2013.01); H04N 5/23216 (2013.01); H04N 5/23245 (2013.01); H04N 5/23296 (2013.01); H04N 5/232933 (2018.08); H04N 5/232945 (2018.08); H04N 5/247 (2013.01); H04N 5/2621 (2013.01)

(58) Field of Classification Search
CPC ............. H04N 5/2258; H04N 5/23216; H04N 5/232933; H04N 5/232945; H04N 5/23296

See application file for complete search history.

(56) References Cited

U.S. PATENT DOCUMENTS

2011/0050963 A1 3/2011 Watabe
2011/0242369 A1* 10/2011 Misawa ............ H04N 5/232
348/240.2
2016/0007008 A1 1/2016 Molgaard et al.
2019/0082101 A1* 3/2019 Baldwin ........... H04N 5/23216

FOREIGN PATENT DOCUMENTS

CN 105245771 A 1/2016
JP 2005-094465 A 4/2005

* cited by examiner

Primary Examiner — Daniel M Pasiewicz
(74) Attorney, Agent, or Firm — ScienBiziP, P.C.

(57) ABSTRACT

An electronic apparatus includes first and second cameras having the same imaging direction, display device, and control device. The control device performs an imaging area display operation to cause the display device to display an imaging area of the second camera in overlay on an image captured by the first camera.

12 Claims, 8 Drawing Sheets

ELECTRONIC APPARATUS, CONTROL DEVICE, AND CONTROL METHOD

BACKGROUND

1. Field

The present disclosure relates to an electronic apparatus, control device, and control method.

2. Description of the Related Art

Mechanisms of using two cameras independently operative of each other in a portable electronic apparatus, such as a smart phone, are disclosed. For example, Japanese Unexamined Patent Application No. 2005-94465 discloses an imaging apparatus. The disclosed imaging apparatus includes a video capturing element and a still-image capturing element. The video capturing element captures a video while the still-image capturing element independently captures a still image.

The imaging apparatus disclosed in Japanese Unexamined Patent Application No. 2005-94465 displays only a video of vide-capturing camera on a display and a user is unable to recognize an imaging area of a still-image camera. This inconvenience is even more pronounced when the imaging area of a still-image camera is electronically zoomed independently of the imaging area of the video camera.

It is desirable to provide an electronic apparatus including two cameras and operating in a manner such that the imaging area of one camera is more accurately displayed on the image captured by the other camera.

SUMMARY

According to an aspect of the disclosure/there is provided an electronic apparatus. The electronic apparatus includes a first camera and a second camera, having the same imaging direction from the electronic apparatus, a display device that displays an image captured by the first camera, and a control device. The control device performs an imaging area display operation to cause the display device to display an imaging area of the second camera in overlay on the image captured by the first camera.

According to another aspect of the disclosure, there is provided a control device that controls an electronic apparatus including a first camera and a second camera, having the same photographing direction from the electronic apparatus, and a display device that displays an image captured by the first camera. The control device includes an imaging area display unit that causes the display device to display an imaging area of the second camera in overlay on the image captured by the first camera.

According to another aspect of the disclosure, there is provided a method of controlling an electronic apparatus. The electronic apparatus includes a first camera and a second camera, having the same photographing direction from the electronic apparatus, and a display device that displays an image captured by the first camera. The method includes causing the display device to display an imaging area of the second camera in overlay on the image captured by the first camera.

Advantageous Effects of Invention

An aspect of the disclosure advantageously provides an electronic apparatus including two cameras and operating in a manner such that the imaging area of one camera is more accurately displayed on the image captured by the other camera.

BRIEF DESCRIPTION OF THE DRAWINGS

FIGS. 2A and 2B illustrate the smart phone of the first embodiment of the disclosure wherein

FIGS. 3A and 3B illustrate coordinate systems related to coordinate conversion of imaging areas of cameras of the first embodiment of the disclosure wherein

FIGS. 7A and 7B illustrate coordinate systems related to coordinate conversion of the imaging area of the second embodiment of the disclosure wherein

DESCRIPTION OF THE EMBODIMENTS

First Embodiment

Overview

Figure 1:
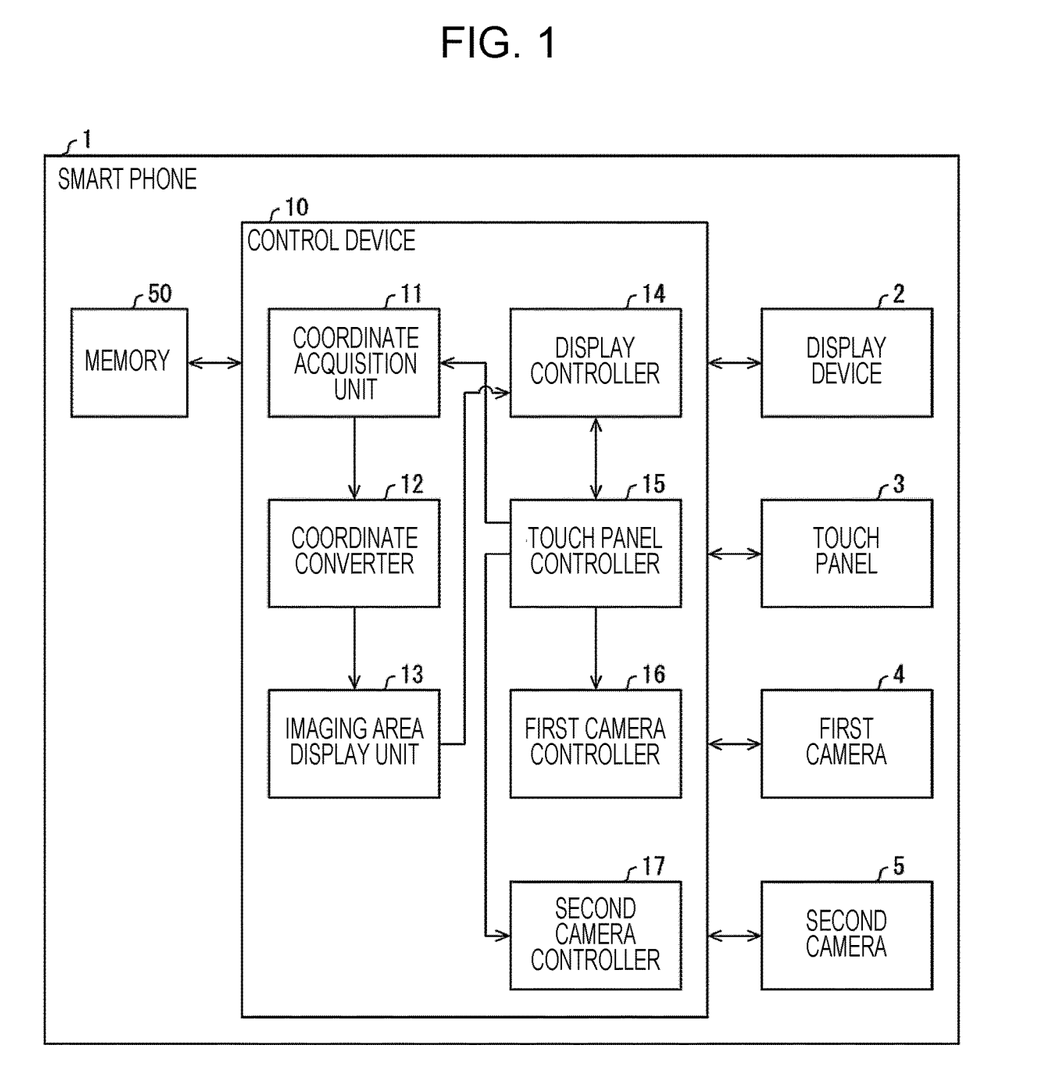
FIG. 1 is a functional block diagram illustrating a smart phone of a first embodiment of the disclosure.
Figure 2A:
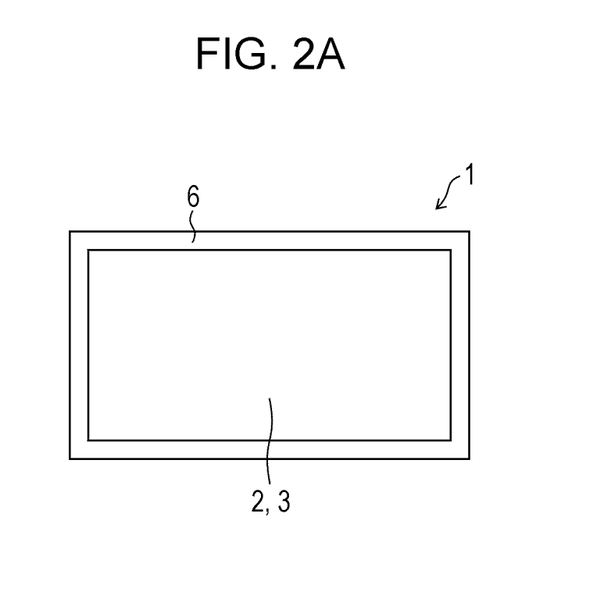
FIG. 2A illustrates a front surface of the smart phone and FIG. 2B illustrates a rear surface of the smart phone.
Figure 2B:
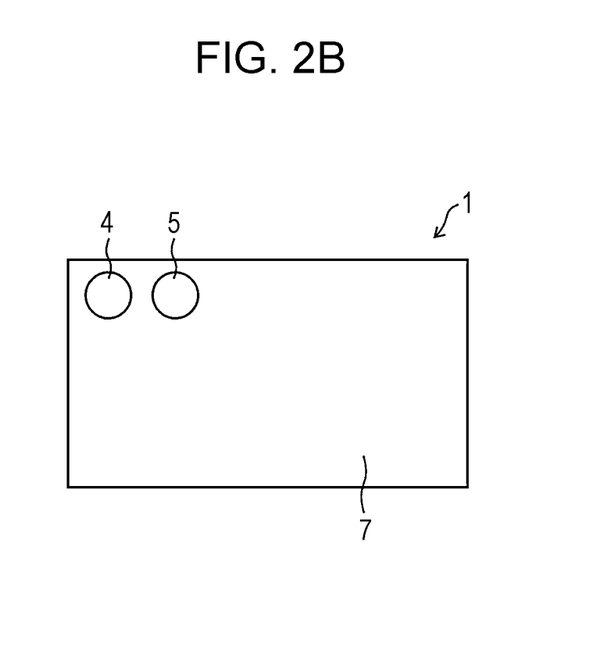

First embodiment of the disclosure is described with reference to FIGS. 1 through 5. FIG. 1 is a functional block diagram illustrating a smart phone (electronic apparatus) 1 of the first embodiment of the disclosure. FIGS. 2A and 2B illustrating the smart phone 1 of the first embodiment of the disclosure. FIG. 2A illustrates a front surface 6 of the smart phone and FIG. 2B illustrates a rear surface 7 of the smart phone. Referring to FIGS. 1 and 2A and 2B, the smart phone 1 includes a display device 2, touch panel 3, first camera 4, second camera 5, control device 10, and memory 50. The electronic apparatus of the first embodiment is not limited to the smart phone 1 and may be any electronic apparatus that includes multiple cameras.

The display device 2 and touch panel 3 are overlaid on the front surface 6 of the smart phone 1. The front surface 6 bears the display device 2 in the smart phone 1. In the smart phone 1, the rear surface 7 is opposite to the front surface 6.

The first and second cameras 4 and 5 are mounted on the rear surface 7 of the smart phone 1. The surface bearing the display device 2 is different from the surface bearing the first and second cameras 4 and 5. A user may photograph an object while monitoring the captured image of the first camera 4 or the second camera 5.

The first and second cameras 4 and 5 may be mounted on the front surface 6 of the smart phone 1. The first camera 4 and the second camera 5 are mounted on the same surface. So long as the first and second cameras 4 and 5 are aligned in the same photographing direction to photograph the same direction from the smart phone 1, the first and second cameras 4 and 5 may be mounted on different surfaces. The first and second cameras 4 and 5 mounted on different surfaces fall within the scope of the disclosure.

Each of the first and second cameras 4 and 5 includes as a light receiving element a charge-coupled device (CCD) or a complementary metal oxide semiconductor (CMOS). Each of the first and second cameras 4 and 5 may capture a still image and/or a video. In accordance with the first embodiment, it is desired that the first camera 4 captures a video while the second camera 5 captures a still image. In this configuration, the user may photograph a still image with the second camera 5 while photographing a video with the first camera 4. Each of the first and second cameras 4 and 5 may be a camera capable of capturing a two-dimensional image or a stereo camera capable of capturing a three-dimensional image.

Control Device

The control device 10 may be a central processing unit (CPU) and controls the whole smart phone 1. The control device 10 includes a coordinate acquisition unit 11, coordinate converter 12, imaging area display unit 13, display controller 14, touch panel controller 15, first camera controller 16, and second camera controller 17.

Figure 3A:
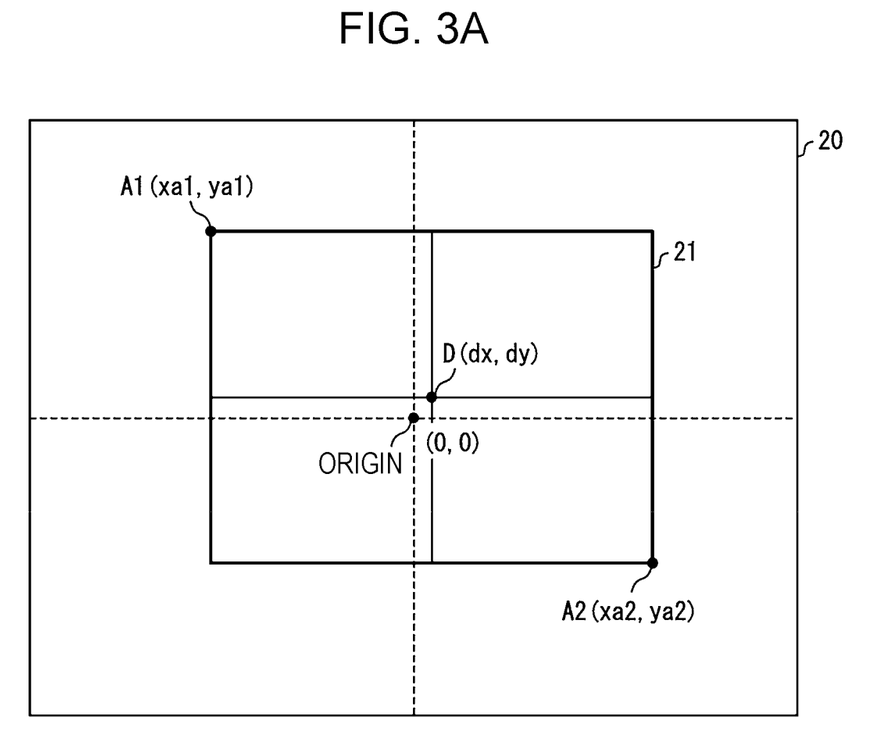
FIG. 3A illustrates a coordinate system defining the imaging area of a first camera and FIG. 3B illustrates a coordinate system defining the imaging area of a second camera.
Figure 3B:
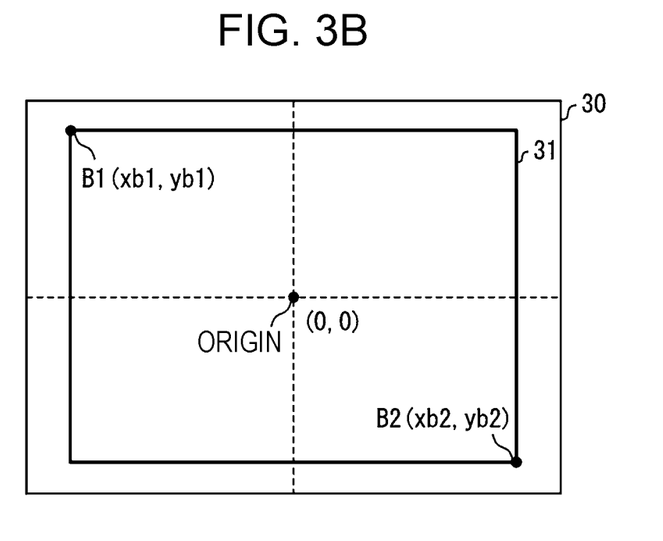

FIGS. 3A and 3B illustrate coordinate systems related to coordinate conversion of imaging areas of cameras of the first embodiment of the disclosure. FIG. 3A illustrates a coordinate system defining the imaging area of a first camera and FIG. 3B illustrates a coordinate system defining the imaging area of a second camera. Referring to FIGS. 3A and 3B, processes performed by the coordinate acquisition unit 11 and the coordinate converter 12 are described below.

Coordinate Acquisition Unit

Figure 4:
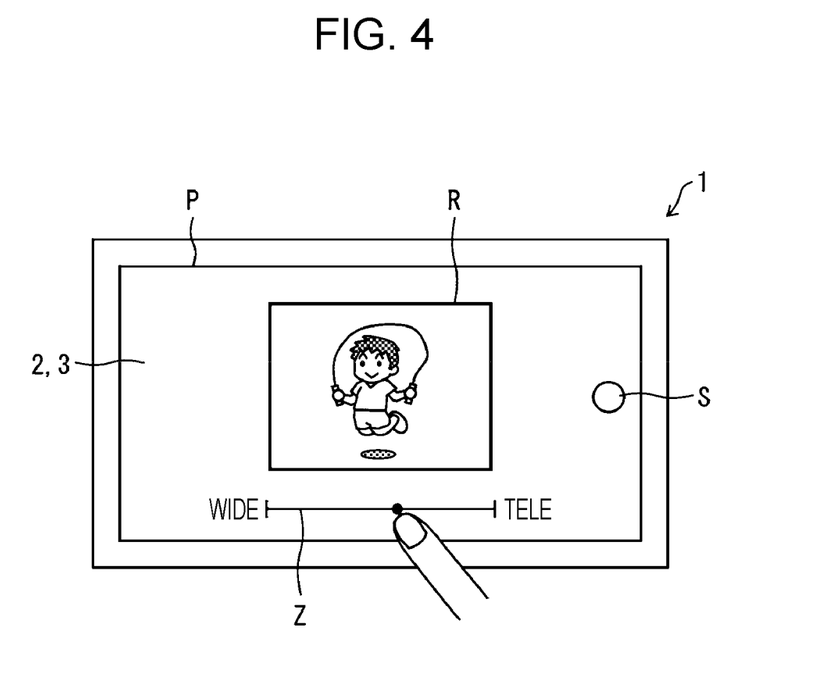
FIG. 4 illustrates the imaging area of the second camera of the first embodiment of the disclosure displayed on a display device.

The coordinate acquisition unit 11 acquires the imaging areas R of the first and second cameras 4 and 5 as coordinate information (see FIG. 4). Referring to FIG. 3A, the coordinate acquisition unit 11 sets up a first coordinate system 20 having the origin (0, 0) placed at the center of the imaging area of the first camera 4. The imaging area of the first camera 4 serving as a reference of the first coordinate system 20 may be the maximum imaging area of the first camera 4 or the imaging area of the first camera 4 based on the current electronical zoom magnification of the first camera 4.

Referring to FIG. 3B, the coordinate acquisition unit 11 sets up a second coordinate system 30 having the origin (0, 0) at the center of the maximum imaging area in accordance with the maximum imaging area of the second camera 5. Let (xa, ya) represent coordinates at any point in the first coordinate system 20 and let (xb, yb) represent coordinates at any point in the second coordinate system 30. The coordinate acquisition unit 11 acquires coordinates at predetermined point in the first coordinate system 20 and the second coordinate system 30 in a manner such that any of xa, xb, ya, and yb ranges from −1 to 1, inclusive.

The coordinate acquisition unit 11 performs a coordinate acquisition operation to acquire, as second area information 31, information including the origin (0,0) at the center of the current imaging area R of the second camera 5, coordinates B1 (xb1, yb1) at the top left corner of the imaging area R, and coordinates B2 (xb2, yb2) at the bottom right corner of the second camera 5. The top, bottom, left and right sides of the imaging area R are aligned with those of the page of FIGS. 3A and 3B. The disclosure is not limited to this alignment. The alignment may be changed such that the top, bottom, left and right sides of the imaging area R match those of the smart phone 1 when the smart phone 1 is pointed to an object.

The imaging area R may be calculated in accordance with the electronic zoom magnification of the second camera 5. If the electronic zoom magnification of the second camera 5 is magnified by α, the maximum imaging area of the second camera 5 is magnified by 1/α. The coordinate acquisition unit 11 acquires −(1/α)xb1 and −(1/α)yb1 as the values of the coordinates B1 and (1/α)xb2 and (1/α)yb2 as the values the coordinates B2.

Coordinate Converter

The coordinate converter 12 performs a coordinate conversion operation to convert the second area information 31 acquired by the coordinate acquisition unit 11 into coordinates in the first coordinate system 20 and to acquire information on the coordinates as first area information 21. Specifically, the coordinate converter 12 converts the origin of the second coordinate system 30, coordinates B1 and the coordinates B2 respectively into coordinates D (dx, dy) of the first coordinate system 20, coordinates A1 (xa1, ya1), and coordinates A2 (xa2, ya2). In other words, the coordinate converter 12 acquires information on the coordinates D, and the coordinates A1 and A2 as the first area information 21.

The coordinate converter 12 herein acquires the coordinates D in view of information on a difference between the optical axis of the first camera 4 and the optical axis of the second camera 5. In other words, the coordinate converter 12 acquires the first area information 21 in accordance with the information on the difference between the optical axis of the first camera 4 and the optical axis of the second camera 5. For example, the information on the difference between the optical, axes may be position information on the coordinates D corresponding to the origin of the second camera 5.

The coordinate converter 12 acquires the coordinates A1 and coordinates A2 in accordance with information on a difference between the view angle of the first camera 4 and the view angle of the second camera 5. Specifically, the coordinate converter 12 acquires the first area information 21 in accordance with the information on the difference between the view angle of the first camera 4 and the view angle of the second camera 5. For example, the information on the difference between the view angles may be information on a ratio of the transverse length of the maximum imaging area of the first camera 4 to the transvers length of the maximum imaging area of the second camera 5 along the transverse direction of the smart phone 1 and information on a ratio of the longitudinal length of the maximum imaging area of the first camera 4 to the longitudinal length of the maximum imaging area of the second camera 5 along the longitudinal direction of the smart phone 1.

An example of the acquisition method of the coordinate converter 12 to acquire the coordinates A1 and coordinates A2 is described below. Let a:b represent the ratio of the longitudinal length of the maximum imaging area of the first camera 4 to the longitudinal length of the maximum imaging area of the second camera 5. The ratio of the transverse lengths and the ratio of the longitudinal lengths of the imaging areas of cameras are typically equal to each other. The ratio of the transverse length of the maximum imaging area of the first camera 4 to the transverse length of the maximum imaging area of second camera 5 is thus set to be a:b in the same manner as in the longitudinal direction. The coordinates D are (dx, dy).

In the condition described above, the coordinate converter 12 calculates values xa1, ya1, xa2, and ya2 of the coordinates A1 and the coordinates A2 in the first area information 21 in accordance with the following equations:

$$xa1=dx-(1/\alpha)\times(b/a),$$

$$ya1=dy-(1/\alpha)\times(b/a),$$

$$xa2=dx+(1/\alpha)\times(b/a),$$

$$ya2=dx+(1/\alpha)\times(b/a),$$

The information on the difference between the optical axes and the information on the difference between the view angles may be stored, on a memory 50 described below, at the factory shipment of the smart phone 1. If the difference between the optical axes of the first and second cameras 4 and 5 is negligibly small in the information on the difference between the optical axes, the coordinates D may be set to be the origin of the first coordinate system 20.

Concerning the information on the difference on the view angles, the ratio of the lengths of the longitudinal direction may be different from the ratio of the lengths of the transverse direction. In the example described above, the maximum imaging area of the first camera 4 is equal to or larger than the maximum imaging area of the second camera 5. The disclosure is not limited to this setting.

If the first coordinate system 20 is set up not based on the maximum imaging area of the first camera 4 but based on the imaging area of the first camera 4 that is based on the current electronic zoom magnification of the first camera 4, the coordinate converter 12 may further account for the electronic zoom magnification as a correction to acquire the coordinates A1 and coordinates A2.

Imaging Area Display Unit

Based on the first area information 21, the imaging area display unit 13 displays on the display device 2 the imaging area R of the second camera 5 in overlay on a captured image P of the first camera 4 displayed on the display device 2 (see FIG. 4). In other words, the imaging area display unit 13 performs the imaging area display operation to cause the display device 2 to display the area based on the first area information 21 (namely, the imaging area R) in overlay on the captured image P of the first camera 4.

FIG. A illustrates the imaging area R of the second camera 5 displayed on a display device 2. Referring to FIG. 4, the display device 2 displays the captured image P, imaging area R, shutter button S, and zoom operation bar Z of the first camera 4. The imaging area R is displayed in overlay on the captured image P displayed on the display device 2.

The imaging area display unit 13 may adjust the size of the imaging area R by changing the electronic zoom magnification of the second camera 5 in response to a user input to the touch panel 3. The second camera controller 17 may change the electronic zoom magnification of the second camera 5 in response to a user's touching operation to the zoom operation bar Z to the touch panel 3 (including tapping or swiping the touch panel 3) displayed on the display device 2.

The coordinate acquisition unit 11 acquires adjustment information of the electronic zoom magnification and the coordinate acquisition unit 11 and coordinate converter 12 generate the first area information 21 responsive to the new electronic zoom magnification. The imaging area display unit 13 adjusts the size of the imaging area R displayed on the display device 2 in accordance with the first area information 21 that has been generated in response to the adjustment of the electronic zoom magnification.

The user operation for the electronic zoom magnification adjustment is not limited to the user input operation to the touch panel 3 but includes a user input operation by using a button on the smart phone 1 or a user input operation by using a communication function provided by the smart phone 1.

Even if the size of the imaging area R has been adjusted, the imaging area display unit 13 maintains (does not change) the display size of the captured image P of the first camera 4. The user may thus adjust the electronic zoom magnification of the second camera 5 without affecting the captured image P of the first camera 4. The user may recognize the imaging area R responsive to the current electronic zoom, magnification.

In the configuration described above, the user may easily recognize the imaging area R while viewing the captured image P of the first camera 4. The imaging area R displayed on the display device 2 is corrected in accordance with the information on the difference between the optical axes of the first and second cameras 4 and 5 and the information on the difference between the view angles of the first and second cameras 4 and 5. The imaging area R displayed on the display device 2 by the imaging area display unit 13 is thus displayed at a relatively more accurate position on the captured image P of the first camera 4. The user may thus recognize a more accurate imaging area R on the captured image P of the first camera 4.

The imaging area display unit 13 may display the imaging area R (an area based on the first area information 21) in the form of a frame on the display device 2. The form in which the imaging area display unit 13 causes the display device 2 to display the imaging area R may be a translucently painted rectangle on the display device 2. The form in which the imaging area R is displayed may be any form so long as the user may recognize both the captured image P and the imaging area R.

The zoom operation bar Z is extended along one of the longitudinal sides of the display device 2 in the longitudinal direction of the display device 2 in FIG. 4. A position closer to the wide end (Wide) of the zoom operation bar Z represents a lower electronic zoom magnification and a position closer to the telephoto end (Tele) of the zoom operation bar Z represents a higher electronic zoom magnification. However, the arrangement of the zoom operation bar Z is not limited to the arrangement described above. The zoom operation bar Z may be extended at any location and in any direction on the display device 2. Any end of the zoom operation bar Z may be the wide end.

Adjustment unit of the electronic zoom magnification displayed on the display device 2 is not limited to the zoom operation bar Z. For example, one of multiple choices of the electronic zoom magnification may be selectively available or a numerical value for the electronic zoom magnification may be specified.

Controller of Devices in Smart Phone

The display controller 14 controls an image displayed on the display device 2. Specifically, the imaging area R of the second camera 5 displayed by the imaging area display unit 13 is displayed on the display device 2 via the display controller 14.

The touch panel controller 15, in convert with the display controller 14, recognizes a touch operation on the touch panel 3. Specifically, the touch panel controller 15 acquires an image displayed on the display device 2 and the location of a touch operation on the touch panel 3 and recognizes the instruction that has been entered by the touch operation.

The first and second camera controllers 16 and 17 control the operations of the first and second cameras 4 and 5, respectively. For example, the second camera controller 17 acquires an adjust instruction of the electronic zoom magnification of the second camera 5 entered on the touch panel 3 and adjusts the electronic zoom magnification of the second camera 5.

Memory

The memory 50 stores a variety of programs installed on the smart phone 1, information on the difference between the optical axes of the first and second cameras 4 and 5 and information on the difference between the view angles of the first and second cameras 4 and 5, and information entered by the user. For example, the memory 50 is a hard disk drive (HDD), solid state drive (SSD), or read-only memory (ROM). The memory 50 may further include a random-access memory (RAM) on which the programs are expanded.

Example of Control Method of Control Device

Figure 5:
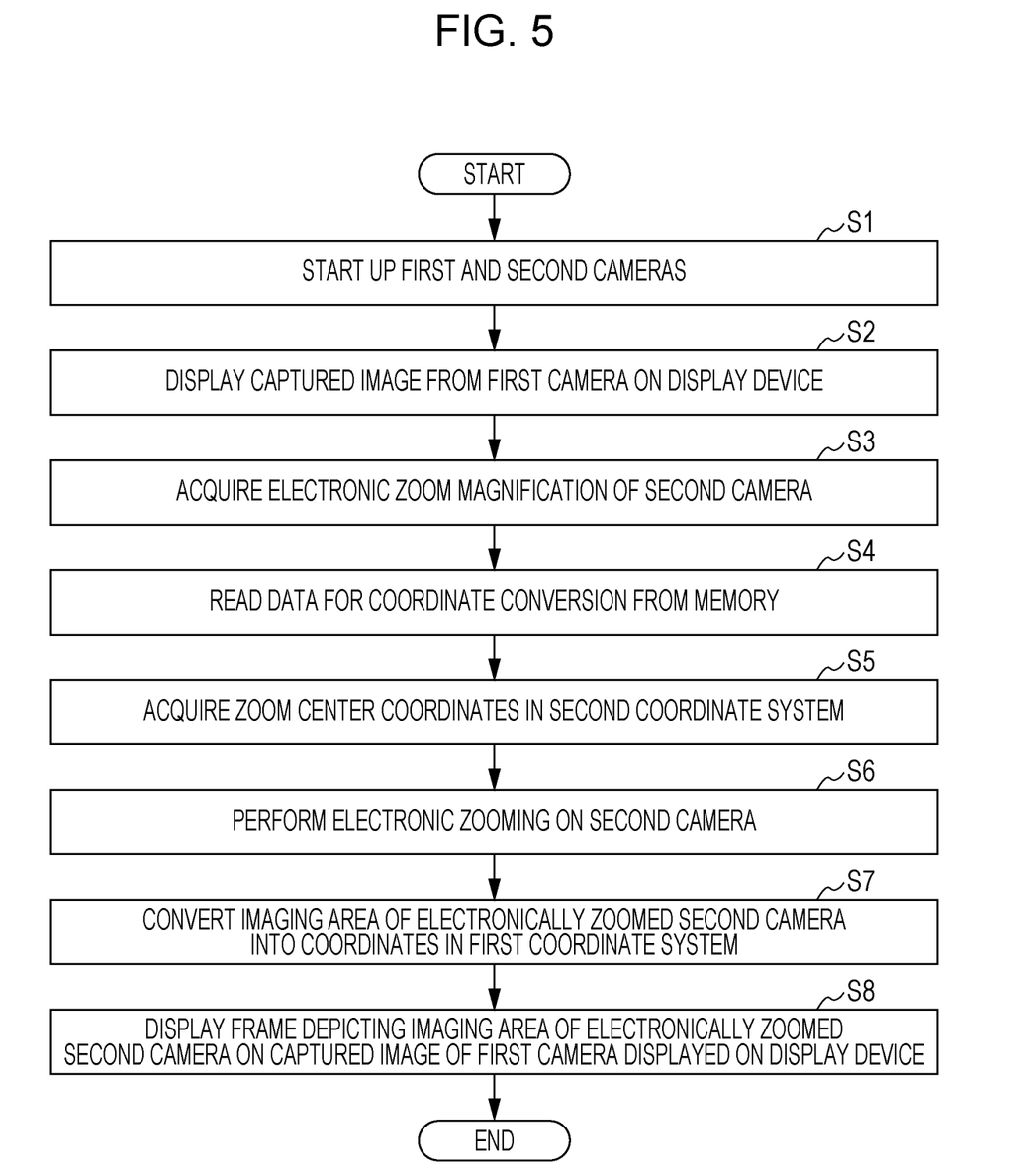
FIG. 5 is a flowchart illustrating a control method performed by a control device of the first embodiment of the disclosure.

FIG. 5 is a flowchart illustrating an example of the control method performed by the control device 10 of the first embodiment. Referring to FIG. 5, the control method performed by the control device 10 to control the smart phone 1 is described below.

The first and second camera controllers 16 and 17 start up the first and second cameras 4 and 5, respectively (S1). The display controller 14 displays the captured image P of the first camera 4 on the display device 2 (S2).

The coordinate acquisition unit 11 acquires the electronic zoom magnification of the second camera 5 (S3). The initial value of the electronic zoom magnification may be the equal magnification or a magnification that is pre-stored on the smart phone 1. The pre-stored magnification may be a magnification set at the factory shipment of the smart phone 1, a magnification set by the user, or the electronic zoom magnification of the second camera 5 when the second camera 5 has captured an image.

The coordinate acquisition unit 11 reads coordinate conversion data from the memory 50 (S3). The coordinate conversion data is may be the information on the difference between the optical axes of the first and second cameras 4 and 5 and the information on the difference between the view angles of the first and second cameras 4 and 5.

The coordinate acquisition unit 11 sets up the first coordinate system 20 in accordance with the imaging area of the first camera 4 and the second coordinate system 30 in accordance with the maximum imaging area of the second camera 5. The coordinate acquisition unit 11 acquires coordinates (zoom center coordinates) serving as the center of the electronic zoom of the second camera 5 in the second coordinate system 30 (S5). The zoom center coordinates are the origin of the second coordinate system 30 in the first embodiment.

The second camera controller 17 performs the electronic zooming of the second camera 5 (S6). The electronic zooming is performed in accordance with the electronic zoom magnification acquired in step S3.

The coordinate acquisition unit 11 and coordinate converter 12 convert the electronically zoomed imaging area R of the second camera 5 into coordinates in the first coordinate system 20 (S7). Specifically, the coordinate acquisition unit 11 acquires the electronically zoomed imaging area R as the second area information 31 displayed in the second coordinate system 30 (coordinate acquisition operation). In the first coordinate system 20, the coordinate converter 12 acquires the first area information 21 corresponding to the second area information 31 (coordinate conversion operation). The acquisition method of the second area information 31 and first area information 21 has been previously described.

The imaging area display unit 13 displays a frame depicting the electronically zoomed imaging area R on the captured image P of the first camera 4 displayed on the display device 2 in step S8 (imaging area display operation).

As described above, through the control method of the first embodiment performed by the control device 10, the smart phone 1 allows the user to easily recognize the electronically zoomed imaging area R while displaying the captured image P of the first camera 4 on the display device 2.

When the user has adjusted the electronic zoom magnification of the second camera 5, the control device 10 may perform the series of operations after returning to the operation in step S3. In this configuration, the size of the frame depicting the imaging area R and displayed on the display device 2 is varied in concert with the adjustment of the electronic zoom magnification of the second camera 5 by the user. The user may thus continuously recognize the latest imaging area R while the first camera 4 is photographing.

Second Embodiment

Second embodiment of the disclosure is described below. For convenience of description, elements having the same functions as those described in the first embodiment are designated with the same reference numerals and the description thereof is not repeated.

Overview

The smart phone 1 of the second embodiment is different from the smart phone 1 of the first embodiment in that the center of the imaging area R of the second camera 5 acquired by the coordinate acquisition unit 11 may be settable at a location other than the origin of the second coordinate system 30.

Figure 6A:
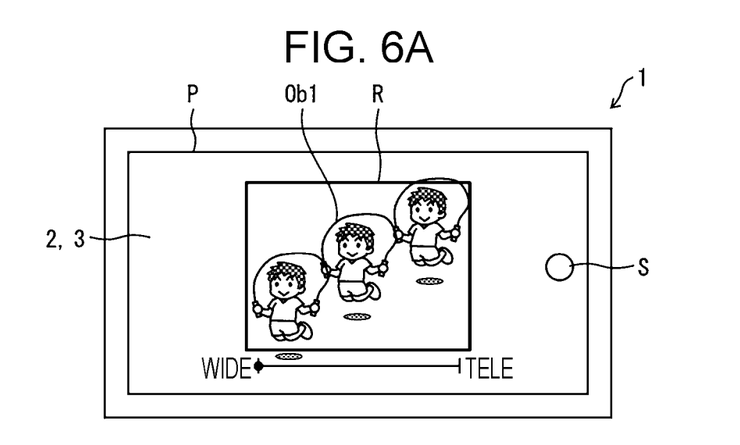
FIGS. 6A and 6B illustrate the imaging area of a second camera of a second embodiment of the disclosure displayed on a display device and FIG. 6C illustrates a change in the position of the imaging area of the second camera.
Figure 6B:
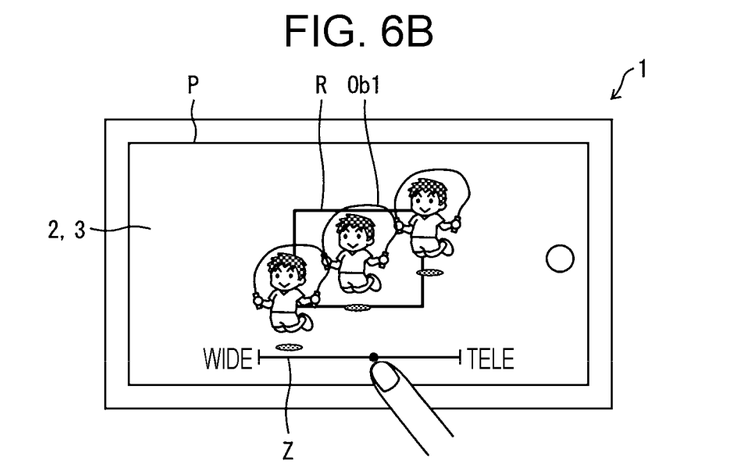
Figure 6C:
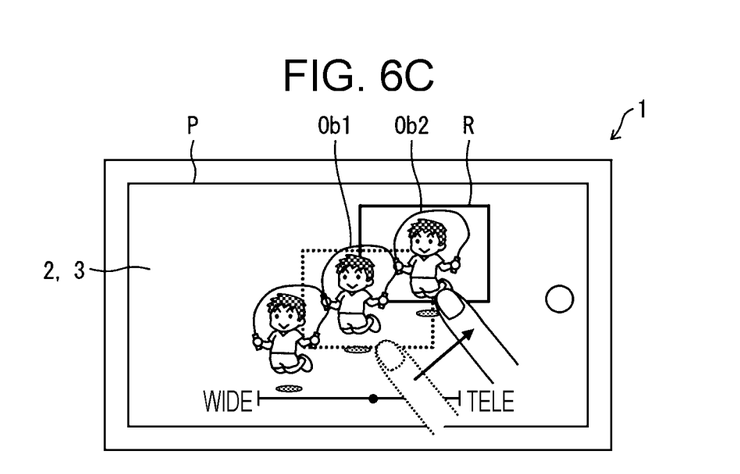

FIGS. 6A and 6B illustrate the imaging area R of the second camera 5 of the second embodiment of the disclosure displayed on the display device 2 and FIG. 6C illustrates a shifting in the position of the imaging area R of the second camera 5.

Referring to FIG. 6A, the imaging area display unit 13 displays the frame depicting the imaging area R in overlay on the captured image P of the first camera 4 on the display device 2. Referring to FIG. 6B, the user may adjust the electronic zoom magnification of the imaging area R by operating the zoom operation bar Z on the touch panel 3 displayed on the display device 2.

The smart phone 1 may move the imaging area R to any position in response to user operation. Specifically, referring to FIG. 6C, the user may move the imaging area R from a position centered on an object Ob1 to the position centered on another object Ob2 by dragging the frame depicting the imaging area R. After the user has shifted the position of the imaging area R, the smart phone 1 may electronically zoom the imaging area R with reference to the center of the imaging area R with the position shifted.

In this configuration, the user may photograph with the second camera 5 in a manner centered on any object in the captured image P of the first camera 4. Specifically, the user may photograph with the first and second cameras 4 and 5 with different objects respectively centered on the imaging areas of the first and second cameras 4 and 5.

Control Device

Figure 7A:
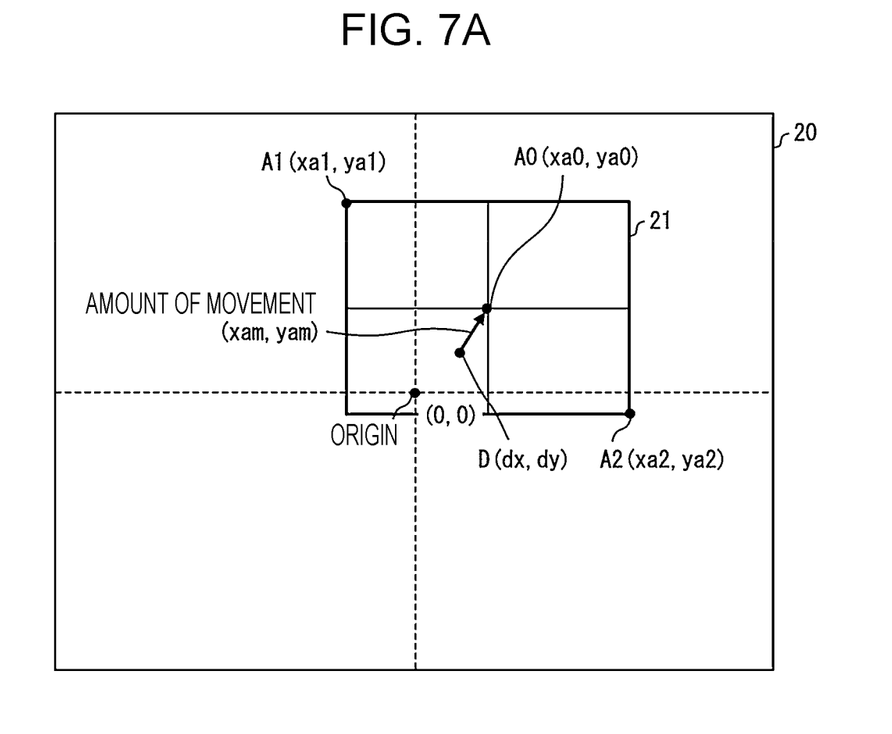
FIG. 7A illustrates a coordinate system defining the imaging area of the first camera and FIG. 7B illustrates a coordinate system defining the imaging area of the second camera.
Figure 7B:
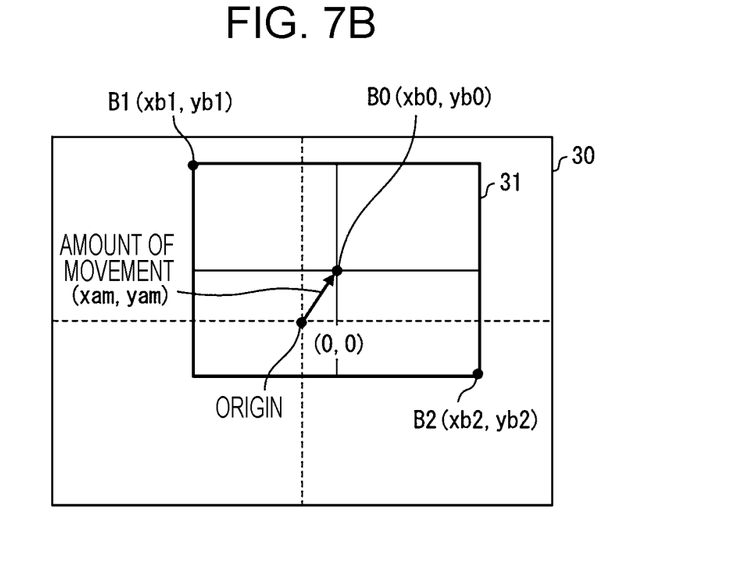

FIGS. 7A and 7B illustrates coordinate systems related to coordinate conversion of the imaging area of the second embodiment. FIG. 7A illustrates a coordinate system defining the imaging area of the first camera 4 and FIG. 7B illustrates a coordinate system defining the imaging area R of the second camera 5. Referring to FIGS. 7A and 7B, the process performed by the coordinate acquisition unit 11 and the coordinate converter 12 of the second embodiment are described below.

Referring to FIGS. 7A and 7B, the coordinate acquisition unit 11 sets the first and second coordinate systems 20 and 30 respectively in accordance with the imaging area of the first camera 4 and the maximum imaging area of the second camera 5. In accordance with the second embodiment, coordinates in the second coordinate system 30 corresponding to the center of the imaging area R of the second camera 5 may be a position other than the origin (0, 0).

The coordinate acquisition unit 11 acquires coordinates A0 at the center position of the imaging area R specified by the user. Let (xam, yam) represent a distance of travel of the imaging area R from the coordinates D(dx, dy) to the current center position of the imaging area R in the first coordinate system 20. The coordinate acquisition unit 11 then acquires xa0 and ya0 in the coordinates A0(xa0, ya0) at the center position of the imaging area R as xa0=dx+xam and ya0=dy+yam. In the same manner as described in the first embodiment, the coordinates D(dx, dy) may be determined based on the information on the difference between the optical axes of the first and second cameras 4 and 5.

If the ratio of the maximum imaging area of the first camera 4 to the maximum imaging area of the second camera 5 is a:b, the coordinate acquisition unit 11 acquires xbm=xam×(a/b) and ybm=yam×(a/b) as xbm and ybm of the travel distance (xbm, ybm) of the imaging area R in the second coordinate system 30. As described with reference to the first embodiment, the values of a and b may be determined in accordance with the difference between the view angles of the first and second cameras 4 and 5.

Since the coordinates prior to the travel of the imaging area R is the origin (0, 0), the coordinate acquisition unit 11 acquires xb0=0+xbm=xam×(a/b) and yb0=0+ybm=yam×(a/b) as xb0 and yb0 of the coordinates B0(xb0, yb0) in the second coordinate system 30 corresponding to the coordinates A0 as the center position of the imaging area R.

The coordinate acquisition unit 11 acquires the second area information 31 responsive to the electronic zoom magnification of the second camera 5 in the second coordinate system 30 corresponding to the center position of the imaging area R. If the electronic zoom magnification of the second camera 5 is α, the imaging area R is (1/α) times the maximum imaging area of the second camera 5. The coordinate acquisition unit 11 thus acquires xb1 and yb1 of the coordinates B1 and xb2 and yb2 of the coordinates B2 in accordance with the following equations:

$xb1=xb0-(1/\alpha)=xam\times(a/b)-(1/\alpha),$ $yb1=yb0-(1/\alpha)=yam\times(a/b)-(1/\alpha),$ $xb2=xb0+(1/\alpha)=xam\times(a/b)+(1/\alpha),$ $yb2=yb0+(1/\alpha)=yam\times(a/b)+(1/\alpha),$ The coordinate acquisition unit 11 performs a coordinate acquisition operation to acquire as the second area information 31 information including the coordinates B0(xb0, yb0), the coordinates B1(xb1, yb1), and the coordinates B2(xb2, yb2) related to the current imaging area R of the second camera 5.

The coordinate converter 12 performs the coordinate conversion operation to convert the second area information 31 acquired by the coordinate acquisition unit 11 into coordinates in the first coordinate system 20 and to acquire the information on the coordinates as the first area information 21. Specifically, the coordinate converter 12 converts respectively the coordinates B0, coordinates B1 and coordinates B2 included in the second area information 31 into the coordinates A0(xa0, ya0), coordinates A1(xa1, ya1), and coordinates A2(xa2, ya2) in the first coordinate system 20.

Since the coordinate acquisition unit 31 has acquired the values xa0 and ya0 of the coordinates A0(xa0, ya0) as xa0=dx+xam and ya0=dy+yam as described above, the coordinate converter 32 acquires the values as they are.

The ratio of the maximum imaging area of the first camera 4 to the maximum imaging area of the second camera 5 is a:b as described above and the electronic zoom magnification of the second camera 5 is α. The coordinate converter 12 thus calculates xa1, ya1, xa2, and ya2 in the coordinates A1 and A2 in accordance with the following equations:

$xa1=xa0-(1/\alpha)\times(b/a)=dx+xam-(1/\alpha)\times(b/a),$ $ya1=ya0-(1/\alpha)\times(b/a)=dy+yam-(1/\alpha)\times(b/a),$ $xa2=xa0+(1/\alpha)\times(b/a)=dx+xam+(1/\alpha)\times(b/a),$ $ya2=ya0+(1/\alpha)\times(b/a)=dy+yam+(1/\alpha)\times(b/a),$ In the same manner as in the first embodiment, the imaging area display unit 13 displays the imaging area R on the display device 2 in accordance with the first area information 21 acquired by the coordinate converter 12. The imaging area display unit 13 maintains (does not change) the display position and display size of the captured image P of the first camera 4 even if the user changes the position of the imaging area R. The user may thus shift the position of the imaging area R without affecting the captured image P of the first camera 4.

Example of Control Method by Control Device

Figure 8:
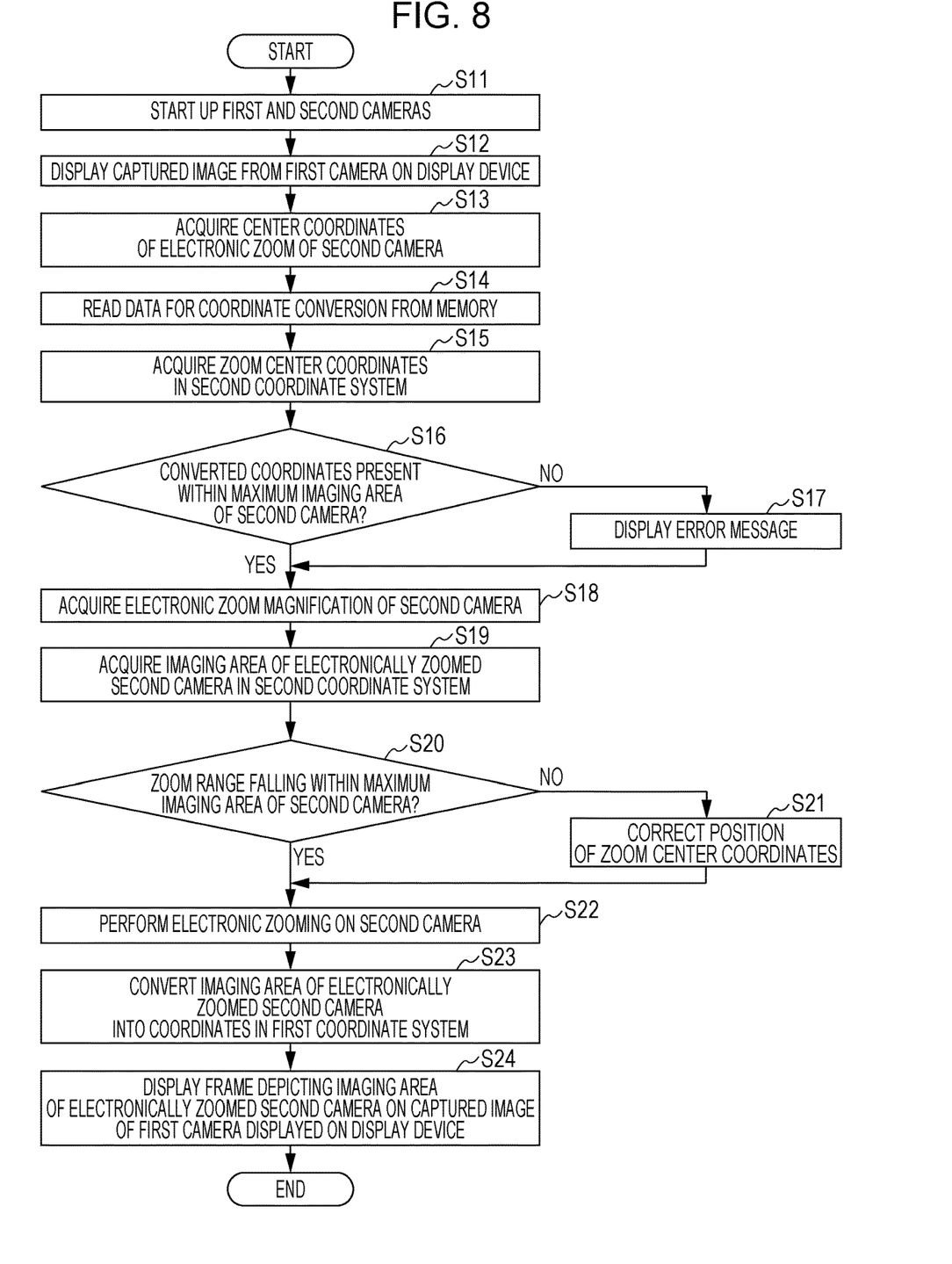
FIG. 8 is a flowchart illustrating a control method of a control device of the second embodiment of the disclosure.

FIG. 8 is a flowchart illustrating an example of the control method performed by the control device 10 of the second embodiment. Referring to FIG. 8, the example of the control method in which the control device 10 controls the smart phone 1 is described.

The first and second camera controllers 16 and 17 respectively start up the first and second cameras 4 and 5 (S11). The display controller 14 displays the captured image P of the first camera 4 on the display device 2 (S12).

The coordinate acquisition unit 11 sets the first coordinate system 20 in accordance with the imaging area of the first camera 4 and the second coordinate system 30 in accordance with the maximum imaging area of the second camera 5. The coordinate acquisition unit 11 acquires the center position of the imaging area R of the second camera 5 as the coordinates A0 in the first coordinate system 20 (S13). The coordinate acquisition unit 11 reads the coordinate conversion data from the memory 50 (S34). The coordinate conversion data may be the information on the difference between the optical axes of the first and second cameras 4 and 5 and the information on the difference between the view angles of the first and second cameras 4 and 5.

Based on the information on the coordinates A0, the coordinate acquisition unit 11 acquires the coordinates B0 (zoom center coordinates) as the center of the electronic zoom of the second camera 5 in the second coordinate system 30 (S15). The coordinates B0 may be a position other than the origin of the second coordinate system 30 in the second embodiment.

The coordinate acquisition unit 11 determines whether the coordinates B0 are present within the maximum imaging area of the second camera 5 (S16). If the coordinates B0 are not present within the maximum imaging area of the second camera 5 (no path from S16), the coordinate acquisition unit 11 displays an error message on the display device 2 (S17). It is noted that since the position of the coordinates A0 are outside the maximum imaging area of the second camera 5, it is difficult to photograph with the second camera 5 in a manner centered on the position corresponding to the coordinates A0.

If the coordinates B0 are present within the maximum imaging area of the second camera 5 (yes path from S16), the coordinate acquisition unit 11 acquires the electronic zoom magnification of the second camera 5 (S18). The initial value of the electronic zoom magnification may be the equal magnification or a magnification that is pre-stored on the smart phone 1. The pre-stored magnification may be a magnification set at the factory shipment of the smart phone 1, a magnification set by the user, or the electronic zoom magnification of the second camera 5 when the second camera 5 has captured an image.

The coordinate acquisition unit 11 acquires the imaging area R of the electronically zoomed second camera 5 in the second coordinate system 30 (S19). The coordinate acquisition unit 11 determines whether the imaging area R falls within the maximum imaging area of the second camera 5 in the second coordinate system 30 (S20). If the imaging area R centered on the coordinates B0 does not fall within the maximum imaging area of the second camera 5 in the second coordinate system 30 (no path from S20), the coordinate acquisition unit 11 corrects the position of the coordinates B0 (zoom center coordinates) such that the whole imaging area R falls within the maximum imaging area of the second camera 5 (S21).

In other words, if at least part of the second area information 31 includes coordinates outside the second coordinate system 30, the coordinate acquisition unit 11 corrects the center position of the imaging area R of the second camera 5 such that the second area information 31 is included in the second coordinate system 30.

If the imaging area R falls within the maximum imaging area of the second camera 5 in the second coordinate system 30 (yes path from S20), the second camera controller 17 electronically zooms the second camera 5 (S22). The electronical zooming is performed in accordance with the electronic zoom magnification acquired in step S18.

The coordinate acquisition unit 11 and coordinate converter 12 convert the imaging area R of the electronically zoomed second camera 5 into coordinates in the first coordinate system 20 (S23). Specifically, the coordinate acquisition unit 11 acquires the electronically zoomed imaging area R as the second area information 31 represented in the second coordinate system 30 (coordinate acquisition operation). The coordinate converter 12 acquires the first area information 21, in the first coordinate system 20, corresponding to the second area information 31 (coordinate conversion operation). The acquisition method to acquire the second area information 31 and the first area information 21 has been described in detail.

The imaging area display unit 13 displays the frame depicting the electronically zoomed imaging area R on the captured image P of the first camera 4 displayed on the display device 2 in step S24 (imaging area display operation).

Through the control method of the second embodiment performed by the control device 10, the smart phone 1 allows the user to easily recognize the electronically zoomed imaging area R while displaying the captured image P of the first camera 4 on the display device 2.

If the user changes the electronic zoom magnification of the second camera 5 or the position of the imaging area R of the second camera 5, the control device 10 returns to step S13 to repeat the series of operations. In this configuration, the size and position of the frame depicting the imaging area R displayed on the display device 2 are adjusted in concert with the electronic zoom magnification of the second camera 5 or the position of the imaging area R adjusted by the user. The user may continuously recognize the latest imaging area R while the first camera 4 is photographing.

Implementation of Control Device Using Software

Control blocks (the coordinate acquisition unit 11, coordinate converter 12, and imaging area display unit 13) of the control device 10 may be implemented using a logic circuit (hardware) formed on an integrated circuit (IC chip) or using software.

If the control blocks are implemented using software, the control device 10 includes a computer that executes instructions of a program as the software implementing each function of the control device 10. The computer includes at least a processor (control device) and at least a computer-readable memory storing the program. The processor reads the program from the memory and executes the program. The control device 10 is thus implemented. For example, the processor may be a central processing unit (CPU). The memory may be a non-transitory and tangible medium, such as a read-only memory, tape, disk, card, semiconductor memory, or a programmable logic circuit. A random-access memory (RAM) on which the program is expanded may also be employed. The program may be supplied to the computer via any transmission medium (such as a communication network or broadcast wave) that transmits the program. An aspect of the disclosure may be implemented in the form of a data signal that is an electronic transmission of the program and is embedded in a carrier wave.

Conclusion

According to a first aspect of the disclosure, there is provided an electronic apparatus (the smart phone 1). The electronic apparatus includes the first camera 4 and the second camera 5, having the same photographing direction from the electronic apparatus, the display device 2 that displays the image P captured by the first camera 5, and the control device 10. The control device 10 performs the coordinate acquisition operation to acquire the imaging area R of the second camera 5 as the second area information 31 in the second coordinate system 30 that is set in accordance with the maximum imaging area of the second camera 5, the coordinate conversion operation to acquire the first area information 21 that correspond to the second area information 31 and set in the imaging area of the first camera 4, and the imaging area display operation to cause the display device 2 to display the area based on the first area information 21 in overlay on the captured image P of the first camera 4.

In the configuration described above, the control device 10 displays the imaging area of the second camera 5 in overlay on the captured image of the first camera 4 on the display device 2. The user thus more accurately recognizes the imaging area of the second camera 5 while photographing with the first camera 4.

In the electronic apparatus (the smart phone 1) according to a second aspect of the disclosure in view of the first aspect, the imaging area display operation may maintain the display size of the captured image P of the first camera 4 even if the size of the imaging area R of the second camera 5 is changed in response to the position of the imaging area R of the second camera 5 and/or zooming of the second camera 5.

In the configuration described above, the control device 10 may adjust the size of the imaging area of the second camera 5 displayed on the display device 2 without affecting the display size of the captured image P of the first camera 4 displayed on the display device 2. The user may thus adjust the imaging area of the second camera 5 independently of the photographing with the first camera 4 and may thus more accurately recognize the adjusted imaging area of the second camera 5.

In the electronic apparatus (the smart phone 1) according to a third aspect of the disclosure in view of one of the first and second aspects, the coordinate conversion operation may acquire the first area information 21 in accordance with the information on the difference between the view angle of the first camera 4 and the view angle of the second camera 5. In this configuration, the control device 10 may cause the display device 2 to display the more accurate imaging area of the second camera 5 on the captured image P of the first camera 4.

In the electronic apparatus (the smart phone 1) according to a fourth aspect of the disclosure in view of one of the first through third aspects, the coordinate conversion operation may acquire the first area information 21 in accordance with the information on the difference between the optical axis of the first camera 4 and the optical axis of the second camera 5. In this configuration, the control device 10 may cause the display device 2 to display the more accurate imaging area of the second camera 5 in overlay on the captured image P of the first camera 4.

In the electronic apparatus (the smart phone 1) according to a fifth aspect of the disclosure in view of one of the first and fourth aspects, the imaging area display operation may display as the frame the area based on the first area information 21. In this configuration, the control device 10 may cause the display device 2 to display the imaging area of the second camera 5 in overlay on the captured image of the first camera 4 in a manner such that the user may more easily recognize the imaging areas.

In the electronic apparatus (the smart phone 1) according to a sixth aspect of the disclosure in view of one of the first and fifth aspects, the first camera 4 may capture a video while the second camera 5 may capture a still image. In this configuration, the user may photograph a video with the first camera 4 while also photographing a still image with the second camera 5 in any area within the video imaging area.

In the electronic apparatus (the smart phone 1) according to a seventh aspect of the disclosure in view of one of the first and sixth aspects, if at least part of the area based on the second area information 31 includes coordinates outside the second coordinate system 30, the coordinate acquisition operation may correct a center position of the imaging area R of the second camera 5 such that the second area information 31 is included in the second coordinate system 30.

In the configuration described above, if the area specified as the imaging area of the second camera 5 is included in the imaging area of the first camera 4 but is not included in the maximum imaging area of the second camera 5, the control device 10 corrects the center position of the imaging area of the second camera 5. In this configuration, only the imaging area that the second camera 5 is able to capture is specified and the image capturing of an area where the user does not intend to photograph may thus be controlled.

According to an eighth aspect of the disclosure, there is provided a non-transitory computer readable medium. The non-transitory computer readable medium stores a program causing a computer to operate as the electronic apparatus of the first aspect. In this configuration, the non-transitory computer readable medium provides the same effect as the first aspect.

According to a ninth aspect of the disclosure, there is provided a control device. The control device controls the electronic apparatus (the smart phone 1) including the first camera 4 and the second camera 5, having the same photographing direction from the electronic apparatus, and the display device 2 that displays the captured image P of the first camera 4. The control device includes the coordinate acquisition unit 11 that acquires the imaging area R of the second camera 5 as the second area information 31 represented in the second coordinate system 30 set in accordance with the maximum imaging area of the second camera 5, the coordinate converter 12 that acquires the first area information 21 corresponding to the second area information 31 in the first coordinate system 20 set in accordance with the imaging area of the first camera 4, and the imaging area display unit 13 that causes the display device 2 to display the area based on the first area information 21 in overlay on the captured image P of the first camera 4.

In the configuration described above, the control device provides the same effect as the first aspect.

According to a tenth aspect of the disclosure, there is provided a control method of the electronic apparatus (the smart phone 1) including the first camera 4 and the second camera 5, having the same photographing direction from the electronic apparatus, and the display device 2 that displays the captured image P of the first camera 4. The control method includes a coordinate acquisition operation to acquire the imaging area R of the second camera 5 as the second area information 31 that is represented in the second coordinate system 30 set in accordance with the maximum imaging area of the second camera 5, the coordinate conversion operation to acquire the first area information 21 corresponding to the second area information 31 in the first coordinate system 20 set in accordance with the imaging area of the first camera 4, and the imaging area display operation to cause the display device 2 to display the area based on the first area information 21 in overlay on the captured image P of the first camera 4.

In the configuration described above, the control method provides the same effect as the first aspect.

Appendix

The control device 10 of each of the embodiments may be implemented using a computer. A control program of the smart phone 1 causing the computer to operate as software elements in the control device 10 as well as a non-transitory computer-readable recording medium having stored the control program falls within the scope of the disclosure.

The disclosure is not limited to the embodiments described above. A variety of modifications is possible to the embodiments without departing from the scope defined in the attached claims. An embodiment resulting from combining technical elements disclosed in the embodiments falls within the scope of the disclosure. A new technical feature may be formed by combining technical elements disclosed in the embodiments.

The present disclosure contains subject matter related to that disclosed in Japanese Priority Patent Application JP 2039-020627 filed in the Japan Patent Office on Feb. 7, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising:
    a first camera and a second camera, having a same photographing direction from the electronic apparatus;
    a display device that displays an image captured by the first camera;
    a touch panel; and
    a control device,
    wherein the control device performs an imaging area display operation,
    to cause the display device to display an imaging area of the second camera in overlay on the image captured by the first camera,
    further to cause the display device to display, a zoom operation bar capable of changing a zoom magnification of the second camera by inputting to the touch panel, the zoom operation bar overlaid on the image captured by the first camera, and
    to cause a size of the imaging area of the second camera displayed on the display device to change according to a change of the zoom magnification of the second camera.

2. The electronic apparatus according to claim 1, wherein the imaging area display operation maintains a display size of the imaging area of the first camera even if a size of the imaging area of the second camera is changed in response to a position of the imaging area of the second camera and/or zooming of the second camera.

3. The electronic apparatus according to claim 1, wherein the control device performs a coordinate conversion operation to acquire first area information in accordance with information on a difference between a view angle of the first camera and a view angle of the second camera.

4. The electronic apparatus according to claim 1, wherein the control device performs a coordinate conversion operation to acquire first area information in accordance with information on a difference between an optical axis of the first camera and an optical axis of the second camera.

5. The electronic apparatus according to claim 1, wherein the imaging area display operation displays as a frame an area based on first area information.

6. The electronic apparatus according to claim 1, wherein the first camera captures a video while the second camera captures a still image.

7. The electronic apparatus according to claim 1, wherein if at least part of an area based on second area information includes coordinates outside a second coordinate system, the control device performs a coordinate conversion operation to correct a center position of the imaging area of the second camera such that the second area information is included in the second coordinate system.

8. A control device controlling an electronic apparatus including a touch panel,
    a first camera and a second camera, having a same photographing direction from the electronic apparatus, and
    a display device displaying an image captured by the first camera,
    the control device comprising an imaging area display unit that
    causes the display device to display an imaging area of the second camera in overlay on the image captured by the first camera,
    further causes the display device to display, a zoom operation bar capable of changing a zoom magnification of the second camera by inputting to the touch panel, the zoom operation bar overlaid on the image captured by the first camera, and
    causes a size of the imaging area of the second camera displayed on the display device to change according to a change of the zoom magnification of the second camera.

9. A method of controlling an electronic apparatus including a touch panel,
    a first camera and a second camera, having a same photographing direction from the electronic apparatus, and
    a display device displaying an image captured by the first camera,
    the method comprising:
    causing the display device to display an imaging area of the second camera in overlay on the image captured by the first camera;
    further causing the display device to display, a zoom operation bar capable of changing a zoom magnification of the second camera by inputting to the touch panel, the zoom operation bar overlaid on the image captured by the first camera; and
    causing a size of the imaging area of the second camera displayed on the display device to change according to a change of the zoom magnification of the second camera.

10. The electronic apparatus according to claim 1, wherein the zoom operation bar extends along one of sides of the display device.

11. The electronic apparatus according to claim 1, wherein the zoom operation bar extends along one side of the display device, and the zoom magnification of the second camera is lower toward one end of the zoom operation bar and higher toward the other end of the zoom operation bar.

12. The electronic apparatus according to claim 1, wherein the imaging area of the second camera is displayed as a translucently painted rectangle on the display device.

* * * * *